Aug. 20, 1929.  H. H. WELCH  1,725,552
METHOD OF AND MEANS FOR INDICATING LIQUID LEVEL
Filed Dec. 22, 1924
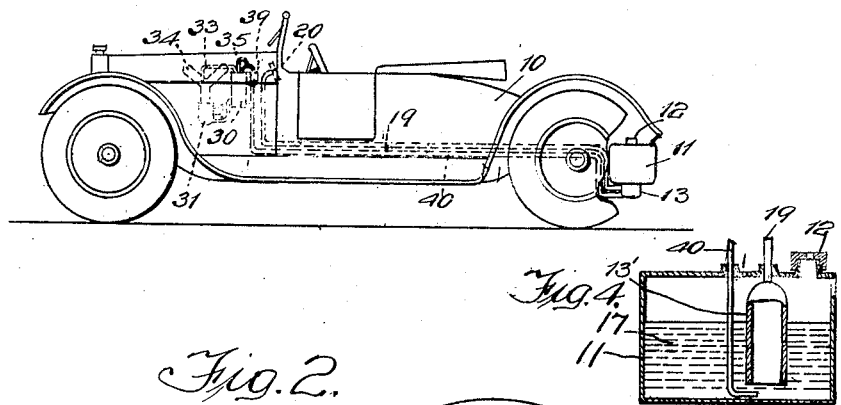
Fig. 1.
Fig. 4.
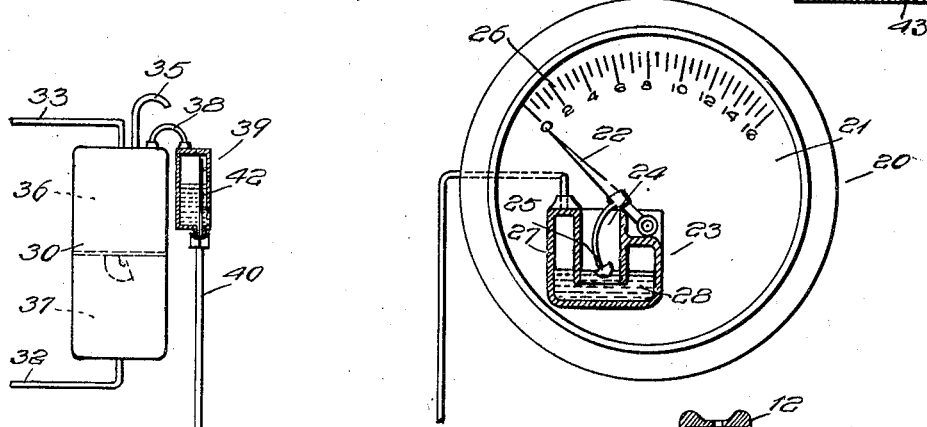
Fig. 2.
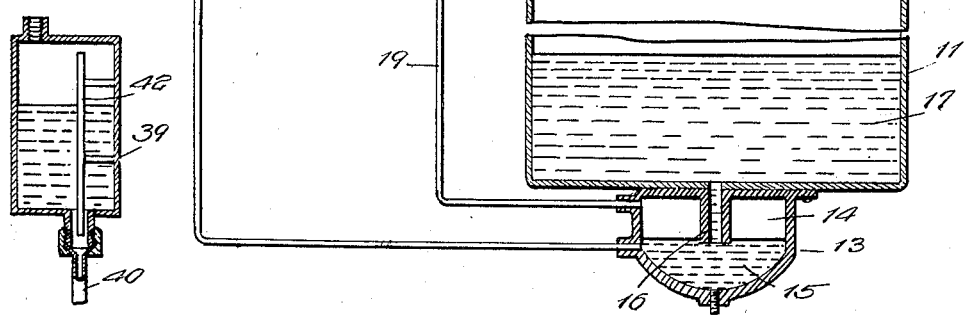
Fig. 3.
Witnesses:
W. F. Kilroy
Harry R. L. White
Inventor
Horace H. Welch
By Brown, Boettcher & Dienner
Attys Patented Aug. 20, 1929.

1,725,552

UNITED STATES PATENT OFFICE.

HORACE H. WELCH, OF NEW YORK, N. Y., ASSIGNOR TO STROMBERG MOTOR DEVICES CO., OF CHICAGO, ILLINOIS, A CORPORATION OF ILLINOIS.

METHOD OF AND MEANS FOR INDICATING LIQUID LEVEL.

Application filed December 22, 1924. Serial No. 757,306.

My invention relates to an improved method of and means for indicating the quantity of liquid contained in a reservoir or tank and has special reference to a liquid level indicator for the purpose of showing the quantity of gasoline or other liquid fuel contained in the storage tank or reservoir of an automobile, and is particularly adapted for use with a reservoir or tank which is positioned at a distance from the indicator, more particularly at the rear of the automobile.

It is customary at the present time to arrange the fuel tank on an automobile beneath the floor and usually at the rear of the body and to raise the fuel from the tank to a small vacuum feed tank arranged adjacent the engine and higher than the carburetor, so that the carburetor feed chamber can be fed by gravity. My invention relates particularly to a simple means for accurately indicating preferably on the dashboard of the automobile the depth of the liquid in the storage tank or, in other words, its quantity. I am aware that pressure indicating means has been devised to indicate the quantity of the fuel, which means generally employs an indicator of some kind on the dashboard and a connecting tube between the indicator and the storage tank. Practically all such systems with which I am familiar depend upon an air line as a means for transmitting the indicating pressure, but so far as I am informed these systems have proven unreliable as to exact indications, due partly to changes in temperature and pressure, partly to the vaporization of the gasoline, and partly to the absorption of the air by the gasoline. These influences tend to destroy the desired datum level from which variations of level in the main tank are reckoned.

As gasoline is the liquid fuel commonly used, and since gasoline is vaporizable at ordinary temperatures, and since the air contained in the indicating system is usually in free contact with the gasoline, the air contains a larger or smaller percentage of gasoline vapor, depending upon its temperature. In such a system, there is a constant interchange of gasoline vapor and air, and in time the system may become highly charged with vapor of the gasoline, under which condition changes in temperature which are constantly occurring will affect the accuracy of the indications. By means of my invention, I provide for a constant addition of fresh air to the system which not only prevents the enrichment of the air in the system by the vaporization of the gasoline, but also preserves the system in accurate indicating condition by establishing and maintaining the aforesaid datum level, i. e., the dividing line between the air in the indicating system and the liquid in or communicating with the main tank.

It is particularly desirable to cause the body of gas which operates the indicator to take in periodically or intermittently a fresh charge of air and to exhale a part of the air which was in the system in order to avoid inaccuracies and faults of operation which are due to variations of atmospheric conditions principally temperature and pressure. For example, when the automobile passes through changes in barometric pressure, it is desirable that the gas trap be periodically recharged with air in order to insure that the system is full of air to the desired datum level to insure accuracy of reading of the device. The same thing is true with regard to temperature. Changes in temperature naturally expand and contract the gas in the trap and in the connecting pipes to the indicator and tend to cause errors in the system through variations in the datum level from which depth is measured unless the system is maintained full of gas. The variations of temperature, furthermore, tend to have a detrimental effect to this extent; that if the air is fairly saturated with gasoline vapor and then is subjected to chilling, there is a tendency to condense the gasoline vapor in the indicating tube. If this condensation should become great enough to form a drop of liquid and if the tube is small enough to be closed by such drop of liquid, the system becomes substantially unworkable.

By means of my invention, I am not only enabled to eliminate the possibility of inaccuracy of indication, but also to provide an indicating system which is substantially constantly in proper working condition; which, if not in proper working condition, due to the condensation of vapor or the absorption of air, can be readily placed in proper indicating condition; to provide a system which is automatically thus maintained in proper working condition, as long as the engine is running, to provide a system in cooperation with the vacuum feed system, and by means of which the indicating system is constantly maintained in perfect indicating condition.

The present application is a continuation in part of my co-pending application, Serial No. 275,506, filed February 7, 1919, and is more particularly concerned with the provision of means for introducing air into the indicating system by means remote from the main tank.

According to the present invention I provide a liquid trap at a point normally above the level of liquid in the main tank which is filled when liquid is drawn by the vacuum tank from the main tank. Obviously, an intermittently operating pump which alternately applies suction and atmospheric pressure instead of a vacuum tank may be employed. This trap has an air injector adapted to inject air into the column of liquid which falls from the liquid trap back to the main tank when the vacuum tank is shut off from suction and opened to atmosphere. At the point where the suction pipe joins the main tank, I provide an air trap which is, in reality, the pressure chamber of the pneumatic indicating system, this indicating system being of the diving bell type. Now the air injected into the returning column of liquid separates out and enters the air trap. While I have shown the air trap in the preferred form as a fitting on the bottom of the main tank, it need not be so constructed, but may be disposed inside of the main tank.

Now, in order to acquaint those skilled in the art with the manner of constructing and operating my invention, I shall describe in connection with the accompanying drawings, a specific embodiment of the same.

In the drawings:—

Fig. 1 is a side elevational view of an automobile in which my invention is embodied;

Fig. 2 is an enlarged diagrammatic view of the same;

Fig. 3 is an enlarged section of the liquid trap or air injecting means; and

Fig. 4 is a diagram of a modification of the air trap or bell.

In the drawings the automobile 10 is shown as having a tank 11 at the rear thereof, this tank having a filler cap 12 which has an opening to atmosphere so that the tank 11 has atmospheric pressure communicating with the space above the liquid.

The tank 11 has a chamber 13 secured to the bottom thereof, this chamber, as will be seen from Fig. 2, comprises an air trap having an air space 14 and a liquid space 15, these two spaces being defined by a depending nipple 16 which communicates with the liquid 17 in the tank 11. While I have shown the liquid level in the chamber 13 as being exactly even with the bottom of the depending nipple 16, it is to be understood that the tendency of the system is to compress the air in the air space 14 and permit the level of liquid 15 to rise above the bottom of the nipple 16. However, as soon as the space 14 is recharged with air, the liquid level will assume the position shown in Fig. 2, that is, substantially even with the bottom of the nipple 16. The bottom of the nipple 16 thus determines a definite level, that is, the predetermined datum level from which the variable level of the liquid 17 is reckoned.

It is to be understood that the chamber 13, instead of being secured on the outside and communicating with the inside, may be mounted on the interior of the tank 11 if so desired.

The air in the air trap 13 communicates by way of a small bore tube 19 with the indicator 20, which indicator 20 is mounted upon the instrument board or dashboard of the vehicle 10.

This indicator 20 may be any convenient pressure indicator, such as a small mechanical pressure gage or a liquid manometer, if so desired. I have shown an indicating instrument having a dial 21 over which an indicating pointer 22 is adapted to play, this indicating pointer 22 being actuated in accordance with the variations of level of the liquid in the manometer 23. The manometer 23 comprises a leg 24 in which plays a float member 25, this float member being connected to the indicator 22 so that rise and fall of the level of the liquid in the leg 24 will tend to move the pointer 22 back and forth over the dial 21. The dial 21 is graduated in terms of liquid level or quantity. In the dial indicated in Fig. 2, the graduations 26 are in terms of gallons in the tank 11. The outer leg of the manometer 23 encircles the inner leg 24, this outer leg 27 communicating with the small bore tube 19 and is therefore subjected to the pressure in the air trap 13. It is obvious that the variation of level of the liquid in the manometer itself may serve as the indication, the pointer and scale in this case serving merely as a convenient multiplying means. The manometer employs preferably mercury as the indicator operating liquid 28. Since the mercury 28 is very much heavier than gasoline, the variations in level in the manometer 23 will be relatively small as compared with the variations of level of the liquid 17. The multiplying means shown is therefore desirable. It is to be understood, however, that I do not intend to be limited to the particular form of indicator shown. A vacuum tank 30 is employed for feeding gasoline to the carburetor indicated at 31, this carburetor 31 being supplied with gasoline through the delivery pipe 32 which conveys the same by gravity from the vacuum tank 30. The suction connection 33 of the vacuum tank leads to the intake pipe or manifold 34 of the engine of the automobile 10. An atmospheric connection 35 is provided on the tank 30 to permit air to enter the vacuum chamber so that the liquid may dump from the upper compartment or suction chamber 36 to the lower compartment or storage reservoir 37 which, as is well understood by those skilled in the art, is commonly employed in devices of this character. I have not shown the operating parts of the vacuum tank 30, since the vacuum tank, per se, is not a novel element and is well understood by those skilled in the art. The operation of the vacuum tank as is understood by those skilled in the art, is controlled by a float in the suction chamber 36, which, when it is necessary to draw more gasoline from the main tank 11, operates to shut off the air connection 35 and to open the vacuum connection 33 to permit the chamber 36 to be subjected to sub-atmospheric pressure. This chamber 36 is connected by a pipe 38 to a liquid trap 39 and the bottom of the liquid trap 39 is connected by the suction pipe 40 to the tank 11 through the intermediary of the chamber 13. The depending nipple 16 in the chamber 13 is of sufficient capacity to supply liquid at a rate greater than the demands of the pipe 40.

The liquid trap 39, which is placed in the connection between the chamber 13 and the vacuum tank 30, is adapted to be filled with liquid when the vacuum tank 30 is on the suction period. Upon cutting off vacuum from the suction chamber 36 and opening the same to atmosphere through the connection 35, the falling column of liquid in the tube 40 is supplied with liquid for a time from said trap 39, as air freely passes in through the connection 35 into the chamber 36, from the chamber 36 into the connection 38, then into the tank 39, until the same is emptied and then down through the pipe 40 until the liquid in the pipe 40 attains substantially the same level as the liquid in the tank 11.

The liquid trap 39 contains a small air injector tube 42 which fits or extends down into the interior of the pipe 40, as indicated in Fig. 3, this air tube 42 forming an air injector for injecting air into the liquid which falls back through the tube 40. The tube 42 is emptied by the suction which is produced by the falling column in the pipe 40, the restriction about the lower end of said tube 49 tending to cause said air tube 42 to eject or drop its liquid contents more rapidly than the fall of liquid level in the tank 39, with the result that said pipe 42 thereafter injects air into the liquid which is conveyed back into the chamber 13. The size of the tank 39 is great enough to supply liquid until the air charged liquid reaches the chamber 13. The purpose of introducing air into the falling column of liquid, which falling column of liquid returns to the chamber 13, is to bring fresh air into the space 14. Any excess of air which is freed in the chamber 13 will pass back up through the nipple 16 and bubble through the liquid 17 into the air space 18 in the main tank 11. Likewise, any liquid which is in excess of that required to maintain the level in the liquid trap 15 is forced back up through the nipple 16 until the level in the tube 40 and the level in the main tank 11 are equalized.

In Fig. 4 I have shown diagrammatically how the chamber 13′ may be disposed in the main tank 11 with its lower end or mouth opening downward into the liquid. This chamber or bell 13′ is normally filled with air and is connected by tube 19 with an indicator or gage such as the indicator 20 or a suitable diaphragm type of pressure gage, such as is well known in the art. The liquid delivery or suction tube 40 has its lower end sealed in the liquid 17 and disposed below the bell 13′ so that upon reflux of gasoline and air from the liquid trap 39 the air that is freed rises into the air trap or bell 13′ and the liquid rejoins the liquid 17 in the main tank 11. Fundamentally the form shown in Fig. 4 is the same as that shown in Fig. 2.

Now, it can be seen that by my scheme and mode of operation each time that the vacuum tank 30 operates to draw liquid from the main tank 11, cessation of the operation of drawing liquid and connection of the suction chamber 36 with atmosphere, results in injection of liquid into the returning column of liquid and the introduction of the air from said injection into the air trap for recharging the indicating system with air. Such air as is in excess of the requirement of the air space 14 is exhaled through the connection 16.

Obviously, the structure of the tank 39 may be varied within limits to secure the air injecting function.

I do not intend to be limited to the details shown and described, except as the same appear in the appended claims.

I claim:—

1. The method of charging the air trap of a pneumatic depth indicating system with air to establish a desired datum level which comprises, creating a flow of liquid from a point above the level of the liquid, the depth of which is to be measured, which flow is discharged into the portion of the liquid sealing the air space of the air trap, introducing air into said flowing liquid, the air separating out from the flow of liquid when the latter is discharged into the air trap thereby expelling the liquid from the trap down to a predetermined datum level.

2. In combination, a main liquid supply tank, an air trap having communication with said tank at the depth to be measured, an indicator, means whereby said indicator is connected to the air space of said trap, the air space of said trap being sealed by a portion of the tank liquid, a high level tank, a pipe leading from said high level tank to the portion of the liquid sealing said trap, and an air injector associated with said pipe and acting upon a flow of liquid from said high level tank to introduce air into the stream of liquid flowing in said pipe to said sealing liquid.

3. The combination, with a pneumatic depth indicating system having an air trap communicating with the liquid, the depth of which is to be measured, of means for charging the system with air to establish a predetermined datum level therein, said means comprising a source of liquid under a suitable head, and a pipe for conducting liquid from said source to the liquid below the air in the trap and an air injector for said pipe.

4. In combination, a main tank, a chamber providing an air trap communicating with the liquid of the tank at the depth to be measured, a suction pipe withdrawing liquid from the tank through said chamber, means for drawing liquid in said pipe to a point above the level of liquid in the tank and permitting it to recede to the tank, and means for introducing air into said receding column.

5. In combination, a main supply tank, an air trap communicating with the lower part of the main tank, a pressure actuated indicator connected to the air space of the trap, a liquid trap above the air trap, a vacuum tank connected to the top of the liquid trap, a connection from the liquid trap to the bottom of the air trap, and means for discharging air into said connection and thereby into the air space of the air trap by the falling column of liquid from the liquid trap to the air trap.

6. In combination, a main supply tank, an air trap communicating with the liquid in the lower part of the main tank so as to be sealed by the liquid, a pressure actuated indicator connected to the air space of said air trap, a chamber forming a liquid trap, means whereby said liquid trap communicates with the liquid sealing the lower part of said air trap, a vacuum tank connected to said chamber, means for injecting air into the connection between the vacuum tank and the chamber for recharging the air trap with air.

7. In combination, a main tank, a vacuum tank intermittently actuated to raise a column of liquid from the main tank and then let the same fall back toward the main tank, an air trap, an indicator connected to the air space of said trap, a connection from the main tank to the air trap, a connection from the air trap to the vacuum tank, and means for injecting air into the column of liquid while the same is falling back from the vacuum tank towards the main tank, said air being freed and compressed in the air trap by the fall of the column of liquid.

8. The method of indicating the depth of liquid in a tank which comprises raising a column of liquid by suction from the lower part of the tank, permitting said column of liquid to drop, introducing air into said dropping column of liquid while the same is moving, separating out the air and trapping the same, compressing said trapped air between the falling column and the liquid in the tank, then indicating the pressure of said body of air in terms of depth.

9. In combination, a main supply tank, a vacuum tank for raising gasoline from said main tank, a connection between said tanks comprising an air trap communicating with the liquid in the main supply tank below the level of liquid in the tank and a liquid trap, said vacuum tank placing the said connection into communication alternately with a source of vacuum and with atmosphere, a pressure actuated indicator communicating with the top of the air trap, and means for discharging air into the liquid flowing from the liquid trap into the air trap, said liquid trap being located above the level of liquid in the main tank.

10. In a device of the class described, in combination, a liquid supply tank, an intermittently operating suction system including a suction device and a conduit extending from a position near the bottom of the storage tank to the suction device, a gauge system including a device for indicating the level of the liquid in the storage tank, and a conduit which extends from a point near the bottom of the supply tank to the gauge, said first and second conduits having their lower open ends so arranged that the lower open end of the first named conduit is below the lower open end of said second named conduit, and means for admitting air into said first named conduit when the liquid is falling by gravity into the storage tank, said air being discharged with the liquid through the lower open end of said conduit to be received in the corresponding end of said second named conduit.

11. In a device of the class described, in combination, a liquid supply tank, an intermittently operating suction system including a suction device and a conduit extending from a position near the bottom of the supply tank to the suction device, a gauge system including a device for indicating the level of the liquid in the storage tank, and a conduit which extends from a point near the bottom of the supply tank to the gauge, said first and second conduits having their lower ends so arranged that the lower open end of the first named conduit is below the lower open end of said second named conduit, and means for entraining air in the liquid in said first named conduit during the return flow of the liquid.

12. In combination, a main supply tank, a vacuum tank for raising gasoline from said main tank, a connection between said tanks comprising a liquid trap above the level of liquid in the main tank, and an air trap below the liquid trap, said vacuum tank placing the said connection into communication alternately with a source of vacuum and with atmosphere, a pressure actuated indicator communicating with the top of the air trap, said liquid trap having means for discharging air with the liquid from said liquid trap into the air trap, said air trap providing a space for separating the air and liquid, the air recharging the air trap and the liquid serving to seal the air trap.

13. In combination, a main tank for liquid, an air trap having communication with said tank at the full depth of liquid to be measured and having its air space sealed by a portion of the said liquid, an indicator for indicating the depth of liquid in the tank, said indicator being actuated by the air pressure in the air trap, a high level tank for liquid, a pipe leading from the bottom of said second tank downward to the liquid seal for said trap, and an air injector associated with said pipe for introducing air into the liquid flowing through said pipe, said air injector being disposed within said second tank.

14. In combination, a main tank for liquid, an air trap having communication with said tank at the full depth of liquid to be measured and having its air space sealed by a portion of the said liquid, an indicator for indicating the depth of liquid in the tank, said indicator being actuated by the air pressure in the air trap, a high level tank for liquid, a pipe leading from the bottom of said second tank downward to the liquid seal for said trap, an air injector associated with said pipe for introducing air into the liquid flowing through said pipe, said air injector being disposed within said second tank, and means for subjecting said second tank alternately to suction and to atmosphere.

15. In combination, a main tank for liquid the depth of which is to be indicated, a high level tank, a pressure actuated indicating system having an air trap communicating with the liquid in the tank at the full depth to be indicated, a pipe providing communication between the lower parts of the two tanks, and an air injector for said pipe, said injector communicating with the upper end of the second tank.

16. In combination, a main tank for liquid the depth of which is to be indicated, a high level tank, a pressure actuated indicating system having an air trap communicating with the liquid in the tank at the full depth to be indicated, a pipe providing communication between the lower parts of the two tanks, an air injector for said pipe, said injector communicating with the upper end of the second tank, and means for subjecting the second tank alternately to suction and to atmospheric pressure.

17. In combination, a main tank for liquid, a chamber comprising an air trap communicating at its lower end with the tank at the full depth of liquid to be indicated, a feed pipe communicating at its lower end with the liquid in the tank and with the air trap, a second tank at a level higher than the level of the air trap, means for alternately subjecting the second tank to suction for raising liquid from the main tank to said second tank and to atmosphere to permit the liquid in the second tank to return to the main tank, and an air injector for injecting air from the top of the second tank into the liquid flowing back from the second tank into the main tank.

18. In combination, a main tank, an air trap communicating with the liquid of the tank at the depth to be measured, a suction pipe for withdrawing liquid from the tank, said suction pipe extending into the liquid sealing the air space of the air trap, means for drawing liquid in said pipe to a point above the level of liquid in the tank, and permitting it to recede to the tank, and means for introducing air into said receding liquid.

19. In combination, a main supply tank, a vacuum tank, a suction pipe for the vacuum tank for raising gasoline from said main tank, said vacuum tank subjecting the suction pipe alternately to suction and to atmosphere, a chamber communicating with the liquid in the main tank at the desired datum level and providing an air space sealed by liquid, the suction pipe from the vacuum tank communicating with said sealing liquid, an indicator connected to the air space of said chamber, a second chamber connected in series in said suction pipe and disposed above the first chamber, and means disposed in the second chamber for injecting air into the liquid flowing from said second chamber to the first chamber when atmospheric pressure is admitted to the suction pipe by the vacuum tank.

20. In combination, a main supply tank, a vacuum tank for raising gasoline from the main tank, a connection between said tanks comprising a liquid trap above the level of liquid in the main tank and an air trap below the liquid trap, said vacuum tank subjecting the connection alternately to suction and to atmosphere, a pressure actuated indicator communicating with the air space of the air trap, said liquid trap having means for introducing air into the liquid flowing in said connection from the liquid trap into the air trap, said air trap providing a space for separating the air and liquid, the air recharging the air trap and the liquid serving to seal the air trap.

21. In a device of the class described, the combination with a liquid storage tank, an intermittently operating suction system for withdrawing liquid from the tank, a portion of the withdrawn liquid, when the suction is released flowing by gravity back into the supply tank, and a gage system operable by air pressure, of means for introducing air into the withdrawn liquid during its return flow, said suction system and gage system being so co-related that the air entrained in the return flow, when released by discharge of said flow, is received into the gage system.

22. In an apparatus of the class described, the combination with a supply tank, a chamber communicating with said tank and arranged to confine a column of air under the pressure of the head of liquid in said tank, and a gauge connected with said chamber to be actuated by the pressure of air therein, of a receptacle at a higher level than said tank, a vacuum tank for intermittently creating a vacuum in said receptacle, a conduit communicating with said receptacle and with said chamber, and means in said receptacle cooperating with said conduit for entraining air in the recessional flow of liquid from said vacuum tank back to said chamber, whereby said entrained air is discharged to said chamber.

In witness whereof, I hereunto subscribe my name this 16th day of December, 1924.

HORACE H. WELCH.